(12) United States Patent
Macken et al.

(10) Patent No.: US 6,836,389 B2
(45) Date of Patent: Dec. 28, 2004

(54) SLIDER BASECOAT FOR THERMAL PTR REDUCTION

(75) Inventors: Declan Macken, Prior Lake, MN (US); John Robert Pendray, Edina, MN (US); Vee Sochivy Kong, Richfield, MN (US); Mallika Kamarajugadda, Edina, MN (US); Jeremy Adam Thurn, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 139 days.

(21) Appl. No.: 10/383,298

(22) Filed: Mar. 7, 2003

(65) Prior Publication Data

US 2004/0061974 A1 Apr. 1, 2004

Related U.S. Application Data

(60) Provisional application No. 60/414,014, filed on Sep. 27, 2002.

(51) Int. Cl.[7] .............................................. G11B 5/60
(52) U.S. Cl. .................................................. 360/235.1
(58) Field of Search ........................ 360/235.1, 235.2, 360/235.3

(56) References Cited

U.S. PATENT DOCUMENTS

| | | | |
|---|---|---|---|
| 5,283,942 A | 2/1994 | Chen et al. ..................... 29/603 |
| 5,640,753 A | 6/1997 | Schultz et al. ............ 29/603.08 |
| 5,710,683 A | 1/1998 | Sundaram .................... 360/126 |
| 5,774,975 A | 7/1998 | Maffitt et al. ............. 29/603.12 |
| 5,896,243 A | 4/1999 | Koshikawa et al. ......... 360/103 |
| 5,896,244 A | 4/1999 | Watanabe et al. ............ 360/103 |
| 5,898,542 A | 4/1999 | Koshikawa et al. ......... 360/103 |
| 5,909,340 A | 6/1999 | Lairson et al. .............. 360/104 |
| 5,949,627 A | 9/1999 | Williams et al. ............. 360/126 |
| 5,991,113 A | 11/1999 | Meyer et al. .................. 360/75 |
| 6,074,566 A | 6/2000 | Hsiao et al. .................... 216/2 |
| 6,252,741 B1 | 6/2001 | Ahn ......................... 360/235.1 |
| 6,366,428 B1 | 4/2002 | Yamanaka et al. ........... 360/126 |
| 6,441,994 B1 | 8/2002 | Wang et al. .................. 360/123 |
| 6,679,762 B2 * | 1/2004 | Nickel et al. ............. 29/603.08 |
| 6,747,841 B1 * | 6/2004 | Olim et al. ................ 360/235.1 |
| 6,760,191 B1 * | 7/2004 | Yan et al. ..................... 360/128 |
| 2002/0006018 A1 | 1/2002 | Narumi et al. .............. 360/317 |
| 2002/0012195 A1 | 1/2002 | Lahiri et al. .............. 360/97.01 |

OTHER PUBLICATIONS

G.A. Slack and S.B. Austerman, "Thermal Conductivity of BeO Single Crystals," *Journal of Applied Physics*, vol. 42 [12] 4713–4717 (1971).

(List continued on next page.)

*Primary Examiner*—Robert S. Tupper
(74) *Attorney, Agent, or Firm*—Kinney & Lange , P.A.

(57) ABSTRACT

A magnetic head slider having an air bearing surface is used for reading and writing data from a magnetic medium. The magnetic head includes a substrate having a disc opposing face bounded by a leading face, a trailing face, and first and second sided edges. The slider includes an end layer positioned upon the trailing face of the substrate wherein the basecoat has a disc opposing face and is comprised of a material having a coefficient of thermal expansion greater than a coefficient of thermal expansion of the substrate. An air bearing pad is formed solely on the disc opposing face of the end layer. A transducing head is formed in the air bearing pad and exposed at an air bearing surface.

28 Claims, 6 Drawing Sheets

OTHER PUBLICATIONS

W.P. Minnear and R.C. Bradt, "Stoichiometry Effect on the Fracture of $TiO_{2-x}$," *Journal of the American Ceramic Society*, vol. 63 [9] 485–490 (1980).

R. Stevens, "Engineering Properties of Zirconia," *Engineered Materials Handbook*, vol. 4 775–776 (1991).

M. Miyayama et al., "Engineering Properties of Single Oxides," *Engineered Materials Handbook*, vol. 4 748 (1991).

D.C. Harris et al., "Mechanical Strength of Hemispheric Domes of Yttria and Lanthana–Doped Yttria," *Journal of the American Ceramic Society*, vol. 75 [5] 1247–1253 (1992).

G.A. Slack and S.B. Austerman, "Thermal Conductivity of BeO Single Crystals," *Journal of Applied Physics*, vol. 42 [12] 4713–4717 (1971).

W.P. Minnear and R.C. Bradt, "Stoichiometry Effect on the Fracture of $TiO_{2-x}$," *Journal of the American Ceramic Society*, vol. 63 [9] 485–490 (1980).

K. Yasuda et al., "Influence of Grain Size and Temperature on Fracture Toughness of MgO Sintered Bodies," *Journal of the Ceramic Society of Japan Inter. Ed.*, vol. 98 44–49 (1990).

R. Stevens, "Engineering Properties of Zirconia," *Engineered Materials Handbook*, vol. 4 775–786 (1991).

D.C. Harris et al., "Mechanical Strength of Hemispheric Domes of Yttria and Lanthana–Doped Yttria," *Journal of the American Ceramic Society*, vol. 75 [5] 1247–1253 (1992).

R.F. Cook et al., "Indentation Fracture of Polycrystalline Cubic Ceramics," *J. Hard. Mater.*, vol. 5 191–212 (1994).

R.J. Gettings and G.D. Quinn, "Surface Crack in Flexure (SCF) Measurements of the Fracture Toughness of Advanced Ceramics," *Ceramic Engineering and Science Proceedings*, vol. 16 539–547 (1995).

J. Kubler, "Fracture Toughness of Ceramics using the SEVNB Method: Preliminary Results," *Ceramic Engineering and Science Proceedings*, vol. 18 155–162 (1997).

U.S. Appl. No. 09/884,796, filed Jun. 19, 2001, Boutaghou et al.

H. Masumoto, 'On the Thermal Expansion of the Alloys of Iron, Nickel, and cobalt and the Cause of the Small Expansibility of Alloys of the Invar Type', *Science Reports of the Tohoku Imperial University*, vol. XX, 1931.

H. Holleck, *J. Vac. Sci. Technol.*, A 4(6) 2661 (1986).

Wicaksana et al., *J. Vac. Sci. Technol.*, A 10(4) 1479 (1992).

Miyahara et al., *J. Appl. Phys.*, 71(5) 2309 (1992).

Lee et al., *Phys. Rev.*, B 52(1) 253 (1995).

Okimura et al., *Jpn. J. Appl. Phys.*, 34 4950 (1995).

Wiggins et al., *J. Vac. Sci. Technol.*, A 14(3) 772 (1996).

Yeh. et al., *J. Appl. Phys.*, 79(10) 7809 (1996).

Paterson et al., *J. Mater. Res.*, 13(2) 388 (1998).

Son et al., *J. Vac. Sci. Technol.*, A 17(5) 2619 (1999).

R.M Bozorth, Ferromagnetism, *IEEE Press*, 165–166 (1978).

NIST, Material Scince and Engineering Laboratory Ceramics (visited Feb. 27, 2003) http://www.ceramics.nist.gov/srd/summary/ftgbeo.htm.

* cited by examiner

SLIDER BASECOAT FOR THERMAL PTR REDUCTION

CROSS-REFERENCE TO RELATED APPLICATION

This application claims priority from provisional application No. 60/414,014 filed Sep. 27, 2002, for "BASECOAT, OVERCOAT MATERIALS FOR THERMAL PTR REDUCTION" by Declan Macken, John Robert Pendray, Vee Sochivy Kong, Mallika Kamarajugadda, and Jeremy Adam Thurn.

BACKGROUND OF THE INVENTION

The present invention relates generally to the field of magnetic data storage and retrieval systems. In particular, the present invention relates to a slider basecoat for reduced thermal pole-tip protrusion and recession.

Air bearing sliders have been extensively used in magnetic disc drives to appropriately position a transducing head above a rotating disc. In a disc drive, each transducer "flies" just a few nanometers above a rotating disc surface. The transducer is mounted in a slider assembly having a contoured surface. An air bearing force is produced by pressurization of the air as it flows between the disc and slider and is a consequence of the slider contour and relative motion of the two surfaces. The air force prevents unintentional contact between the transducer and the disc. The air bearing also provides a very narrow clearance between the slider transducer and the rotating disc. This allows a high density of magnetic data to be transferred and reduces wear and damage.

Disc storage systems are designed for greater and greater storage capacities, the density of concentric data tracks on discs is increasing (that is, the size of data tracks and radial spacing between data tracks is decreasing), requiring that the air bearing gap between the transducer carried by the slider and the rotating disc be reduced. One aspect of achieving higher data storage densities in discs is operating the air bearing slider at ultra-low flying heights.

For the disc drive to function properly, the slider must maintain the proper fly height and provide adequate contact stiffness to assure that the slider does not contact the disc during operation. Also, the air bearing slider must have either enhanced take-off performance at start up or enhanced ramp load/unload performance to limit contact between the slider and the disc. Such contact would cause damage to the slider during take-off and landing of the slider.

Fly height is one of the most critical parameters of magnetic recording. As the average fly height of the slider decreases, the transducer achieves greater resolution between the individual data bit locations on the disc. Therefore, it is desirable to have the transducers fly as close to the disc as possible.

In a conventional air bearing slider, the slider body is formed from a substrate wafer of conductive ceramic material. On this substrate, a thin film of insulating material is deposited, and a metallic transducer is built therein, by a process such as sputtering. The transducer, which typically includes a writer portion for storing magnetically-encoded information on a magnetic media and a reader portion for retrieving the magnetically-encoded information from the magnetic media, is formed of multiple patterned layers successively stacked upon the substrate. The volume of the transducer is typically much smaller than the volume of the substrate.

The layers of the transducer, which include both metallic and insulating layers, all have different mechanical and chemical properties than the substrate. The differences in properties affect several aspects of the transducer. First, the layers of the transducer will be lapped at different rates. Thus, when an air bearing surface (ABS) of the transducer is lapped during its fabrication, differing amounts of the different materials will be removed, resulting in the transducer having an uneven ABS. Commonly, a greater amount of the metallic layers of the transducer will be removed during the lapping process than will be removed from the substrate. Thus, the lapping process results in a pole tip recession (PTR) of the metallic layers of the transducer with respect to the substrate. The PTR of a particular layer is defined as the distance between the planar air bearing surface of the substrate and the planar air bearing surface of that layer.

Additionally, the insulating material will often recede at an even greater rate than the transducer, leading to material recession that results in a discernable offset at the interface of the insulating material and the slider body substrate material. The variability of the offset prevents the transducer from flying as close to the surface of the magnetic disc as would otherwise be possible.

Further, the differing mechanical and chemical properties of the substrate and transducer layers further affect the air bearing surface during operation of the transducer. As the magnetic data storage and retrieval system is operated, the transducer is subjected to increasing temperatures within the magnetic data storage and retrieval system. In addition, a temperature of the transducer itself, or a part thereof, may be significantly higher than the temperature within the magnetic data storage and retrieval system due to heat dissipation caused by electrical currents in the transducer.

The coefficient of thermal expansion (CTE) is a measure of the change in length for a unit length of material for an incremental change in temperature. The CTE of materials used in forming the substrate is typically much smaller than the CTE of materials used in forming the metallic layers of the transducer. Due to the larger CTE of the transducer's metallic layers, those layers tend to expand a greater amount than the substrate. Thus, when the transducer is subjected to higher operating temperatures, the metallic layers tend to protrude closer to the magnetic disc than the substrate; thereby affecting the PTR of the transducer. This change in PTR caused by temperature is referred to as the Thermal PTR (TPTR).

During operation of the magnetic data storage and retrieval system, the transducer is positioned in close proximity to the magnetic media. A distance between the transducer and the media is preferably small enough to allow for writing to and reading from a magnetic media having a large areal density, and great enough to prevent contact between the magnetic media and the transducer. Performance of the transducer depends primarily upon this distance.

To keep the distance between the transducer and the magnetic media constant, PTR should not change significantly with temperature. If TPTR is large, then the spacing between the transducer and the media will change significantly with temperature, thereby requiring the low-temperature fly height to be high enough to accommodate this variation at higher operating temperatures. On the other hand, if TPTR is close to zero, the low-temperature fly height can be reduced.

Thus, a need exists for an air bearing slider design which achieves a constant, ultra-low transducer flying height, despite the obstacles of differential mechanical and thermal recession. Much of the TPTR originates from the metal layers exposed at the air bearing surface. It is the mismatch in the CTE between the metallic layers of the transducer and the substrate material (which forms the air bearing surface), that gives rise to the thermal protrusion. An air bearing slider design is needed which eliminates the substrate from the air bearing surface and thereby reduces the TPTR of the transducing head.

BRIEF SUMMARY OF THE INVENTION

The present invention relates to a magnetic head having an air bearing surface. The magnetic head includes a substrate having a disc opposing face bounded by a leading face, a trailing face, and first and second sided edges. The slider includes an end layer positioned upon the trailing face of the substrate wherein the basecoat has a disc opposing face and is comprised of a material having a coefficient of thermal expansion greater than a coefficient of thermal expansion of the substrate. An air bearing pad is formed solely on the disc opposing face of the end layer. A transducing head is formed in the air bearing pad and exposed at an air bearing surface.

DETAILED DESCRIPTION

Figure 1:
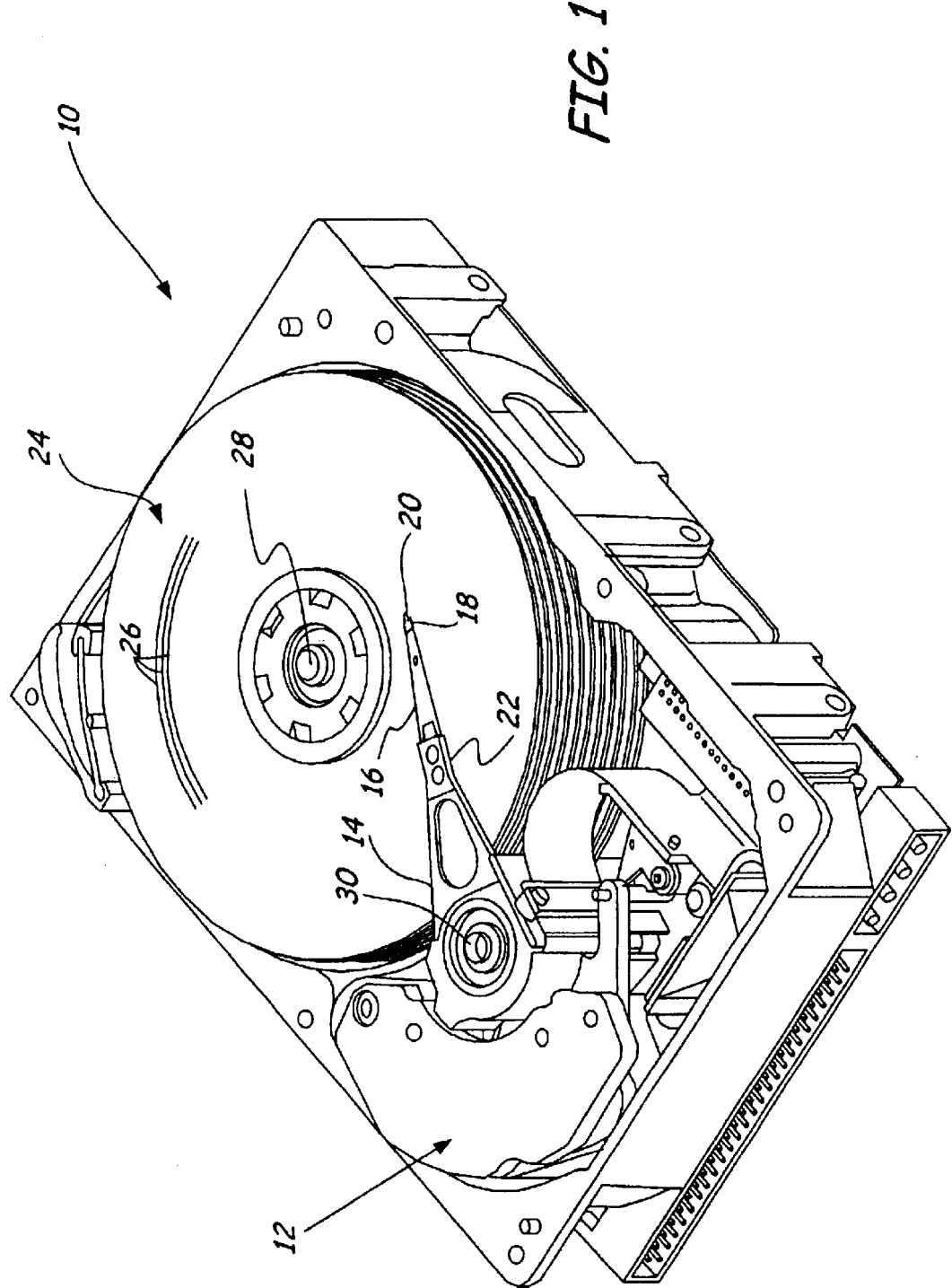
FIG. 1 shows a top perspective view of a disc drive actuation system for positioning a slider over tracks of a disc.

FIG. 1 shows a top perspective view of a disc drive 10, which includes a voice coil motor (VCM) 12, an actuator arm 14, a suspension 16, a flexure 18, a slider 20, a head mounting block 22, and a disc 24. Slider 20 is connected to a distal end of suspension 16 by flexure 18. Suspension 16 is connected to actuator arm 14 at head mounting block 22. Actuator arm 14 is coupled to VCM 12. As shown on the right side of FIG. 1, disc 24 has a multiplicity of tracks 26 and rotates about an axis 28.

During operation of disc drive 10, rotation of disc 24 generates air movement which is encountered by slider 20. This air movement acts to keep slider 20 aloft a small distance above the surface of disc 24, allowing slider 20 to fly above the surface of disc 24. VCM 12 is selectively operated to move actuator arm 14 around an axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2:
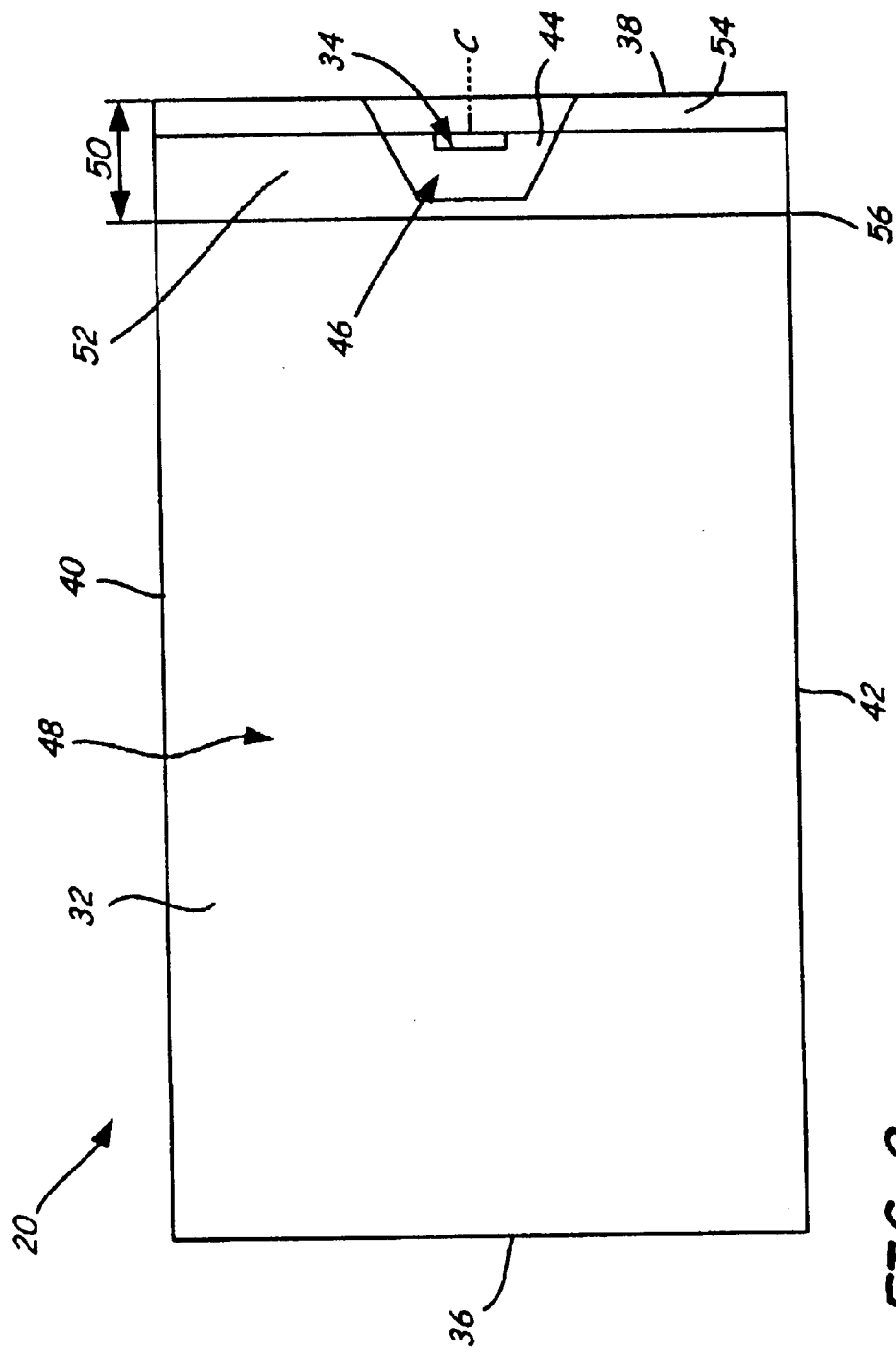
FIG. 2 is a bottom view of one embodiment of a slider of the present invention.

FIG. 2 is a bottom view of air bearing slider 20. Slider 20 has a gimbal opposing face or top surface (not shown) which is attached to flexure 18. Slider 20 also has a disc opposing face 32 carrying a transducing head 34 which faces disc 24 to read and write data from the disc. In addition, slider 20 has a leading edge 36 and an opposite trailing edge 38 which extend between the top surface and disc opposing face 32 of slider 20. A first side edge 40 and a second side edge 42 extend between leading edge 36 and trailing edge 38 of slider 20.

The contour of the disc opposing face of air bearing slider 20 has a significant effect on the flying characteristics of slider 20, and various contours have been proposed and used for air bearing sliders. Examples of two of these are included in U.S. Pat. No. 5,062,017 by Strong et al. and U.S. Pat. No. 5,343,343 by Chapin, both of which are assigned to Seagate Technology Inc. and are hereby incorporated by reference. The slider must maintain an ultra low fly height over disc 24 while disc drive 10 is in operation. While slider 20 is flying over disc 24 (FIG. 1) during operation, head media spacing (HMS) between transducing head 34 and disc 24 must be maintained substantially constant to accurately read and write data to and from the disc.

Disc opposing face 32 of slider 20 defines an air bearing surface 44 (ABS) of the slider. Air bearing surface 44 is the reference level for slider 20. In slider 20 shown in FIG. 2, an air bearing pad 46, shown as a center rail, is positioned adjacent trailing edge 38 of slider 20. Although not shown in FIG. 2, other components such as a cross rail, a channel, or first and second rear portions having an ABS may be formed on the disc opposing face of slider 20, and other components such as air channels recessed from the ABS may be formed in disc opposing face 32.

Slider 20 includes a slider body 48, which is composed of a wafer of an electrically conductive, ceramic substrate material such as $Al_2O_3$—TiC, TiC, Si, SiC, $ZrO_2$ or other composite materials formed in combinations of these materials. An end layer 50, forms a transducer portion of slider 20 adjacent trailing edge 38. End layer 50 includes a basecoat layer 52 and an overcoat layer 54, and both layers are comprised of the same material. End layer 50 is formed of an insulating material, such as titanium dioxide ($TiO_2$), magnesium oxide (MgO), yttria-stabilized zirconium dioxide ($Y_2O_3$—$ZrO_2$), berrylium oxide (BeO), yttria oxide ($Y_2O_3$), or titanium nitride (TiN). In addition, end layer 50 is formed of a dielectric material. An interface 56 defines the intersection between the different materials of slider body 48 and transducer portion 50, in particular substrate 48 and basecoat 52.

Center rail 46, or air bearing pad, is positioned solely upon end layer 50 of slider 20. Center rail 46 is located adjacent trailing edge 38 of slider 20 and is positioned substantially along a centerline (C) of slider 20. Center rail 46 is comprised of the same material as end layer 50. Center rail 46 forms air bearing surface 44 of slider 20. End layer 50 and substrate 48 of slider 20 are recessed from center rail 46. Furthermore, additional contours on disc opposing face 32 of slider 20 are recessed from air bearing surface 44 formed by center rail 46.

Transducing head 34 is formed in center rail 46 substantially along the centerline of slider 20. Transducing head 34 is a multi-layered device comprised of a plurality of metallic and insulating layers. Typically, each of the metallic components of transducing head 34 is formed of an alloy primarily composed of iron (Fe), nickel (Ni), and/or cobalt (Co). For example, similar layers may be formed of Permalloy, a NiFe alloy having a composition of about 20% Fe-80% Ni. Such metallic alloys typically have a large coefficient of thermal expansion (CTE). For example $Ni_{79}Fe_{21}$ has a CTE of about $12.2 \times 10^{-6}/°$ C.

In prior art sliders, end layer 50 is comprised of an insulating material selected to closely match the chemical and mechanical properties of the substrate material used for slider body 48. End layer 50 of the present invention slider 20 is composed of a material having a CTE equivalent to a CTE of the metallic layers of transducing head 34. The CTE of end layer 50 is greater than $7 \times 10^{-6}/°$ C. Ideally, the CTE of end layer 50 is approximately equal to the CTE of the metallic layers of transducing head 34, which is about $12.0 \times 10^{-6}/°$ C., such that the CTEs of the two materials closely match. Furthermore, basecoat 52 has a thickness between about 2.0 microns and about 30 microns, although the thickness may vary within and outside this range depending upon the alignment capabilities of the AAB photo process. End layer 50 has a thickness between about 10 microns and about 70 microns.

Figure 3A:
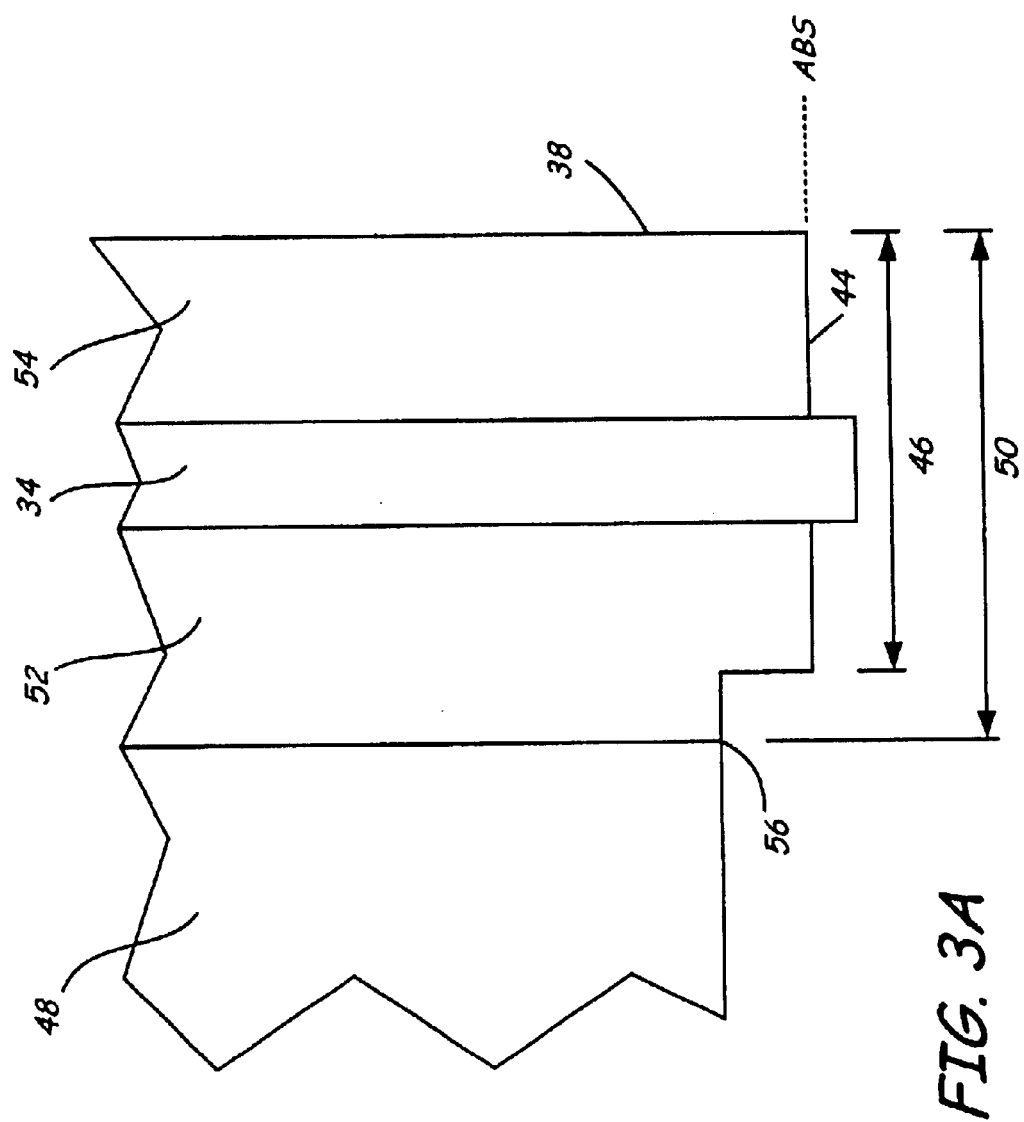
FIG. 3A is a sectional view of the slider shown in FIG. 2.

FIG. 3A is a sectional view of a portion of slider 20 of FIG. 2 taken along the centerline of slider 20. End layer 50 shown in FIG. 2 is comprised of a combination of basecoat layer 52 and overcoat layer 54. Slider 20 includes substrate slider body 48, basecoat 52, transducing head 34, and overcoat 54. Air bearing surface 44 of slider 20 is formed at disc opposing face 32 of air bearing pad 46. Transducing head 34, comprised of metallic and dielectric layers, is formed in air bearing pad 46 between basecoat 52 and overcoat 54. The remainder of slider body 48 is recessed from the ABS by varying step depths, generally formed by a milling process. Although not shown in FIG. 3, disc opposing face 32 of slider 20 may include other features forming the ABS.

Air bearing pad 46 forms the reference level, or air bearing surface 44, of slider 20. Generally, the portions of basecoat and overcoat layers 52 and 54 which do not form part of air bearing pad 46 are recessed from the ABS. In addition, the substrate portion 48 of slider 20 may be recessed from the ABS between about 0.005 microns to about 0.3 microns. The PTR of transducing head 34 is between about 0.0075 microns (recessed) to about $-0.005$ microns (protruded) from the ABS.

The layers of transducing head 34 all of have differing mechanical and chemical properties. Due to these different properties, the layers of transducing head 34 will be lapped at different rates. Thus, the lapping of air bearing surface 44 of transducing head 34 during fabrication results in transducing head 34 having an uneven ABS. Commonly, a greater amount of the metallic layers of transducing head 34 will be removed during the lapping process than will be removed from substrate 48, resulting in a pole tip recession (PTR) of the metallic layers with respect to substrate 48. The PTR of a particular layer is defined as the distance between the ABS of substrate 48 and the ABS of that layer.

The differing mechanical and chemical properties of the layers of transducing head 34 further affect air bearing surface 44 of transducing head 34 during operation. The CTE of the material used in forming slider substrate 48 is typically much smaller than the CTE of the materials used in forming the metallic layers of transducing head 34. Due to the larger CTE of the metallic layers, those layers tend to expand a greater amount than substrate 48. Thus, when transducing head 34 is subjected to high operating temperatures, the metallic layers protrude closer to the magnetic disc than substrate 48 (as shown in FIG. 3), thereby affecting the PTR of the metallic layers of transducing head 34. This change is PTR is caused by the temperature as referred to as Thermal PTR (TPTR).

The present invention addresses the problem of TPTR by using a basecoat and overcoat combination end layer 50 comprised of a material having a CTE equivalent to and closely matching the CTE of the metallic layers of transducing head 34. The material forming basecoat 52 and overcoat 54 has a CTE greater than $7.0 \times 10^{-6}/°$ C. and includes, but is not limited to $TiO_2$, $MgO$, $Y_2O_3$—$ZrO_2$, BeO, $Y_2O_3$, or TiN. In addition, air bearing pad 46, where transducing head 34 is formed, is made of the same material as basecoat 52 and overcoat 54.

Air bearing pad 46 is formed solely upon basecoat and overcoat combination end layer 50 of slider 20 and does not extend upon substrate 48 of slider 20. During isothermal heating, transducing head 34, air bearing pad 46, and basecoat and overcoat combination end layer 50 expand and contract in unison with respect to substrate 48 of slider 20 due to TPTR rather than transducing head 34 expanding and contracting with respect to disc 24. Thus, the fly height between transducing head 34 of slider 20 and disc 24 is maintained. The unison movement of transducing head 34, center rail 46 and end layer 50 overcomes changes in drive ambient temperature to maintain fly height.

The reference surface for slider 20 is air bearing pad 46. Since transducing head 34 and air bearing pad 46 expand and contract in unison, they move in concord with each other and there is no TPTR of transducing head 34 with respect to the ABS (center rail) of slider 20. The fly height is determined based upon air bearing pad 46 as a reference point, so if the ABS of air bearing pad 46 is expanding at a certain rate, the fly height is maintained but transducing head 34 is not expanding any faster than the ABS. In other words, the height of a pole tip of transducing head 34 is made constant so that as transducing head 34 (pole tip) expands and protrudes from the ABS, substrate 48 moves up and down accordingly and no portion of slider 20 will contact the disc. As long as substrate 48 is recessed from transducing head 48 it will not contact disc 24.

In further embodiments of the present invention, air bearing pad 46 is positioned upon end layer 50 of slider 20, however it may be located at any point along trailing edge 38. That is, air bearing pad 46 of the present invention is not required to be located at the centerline of slider 20, as long as air bearing pad 46 is formed solely upon end layer 50.

Figure 3B:
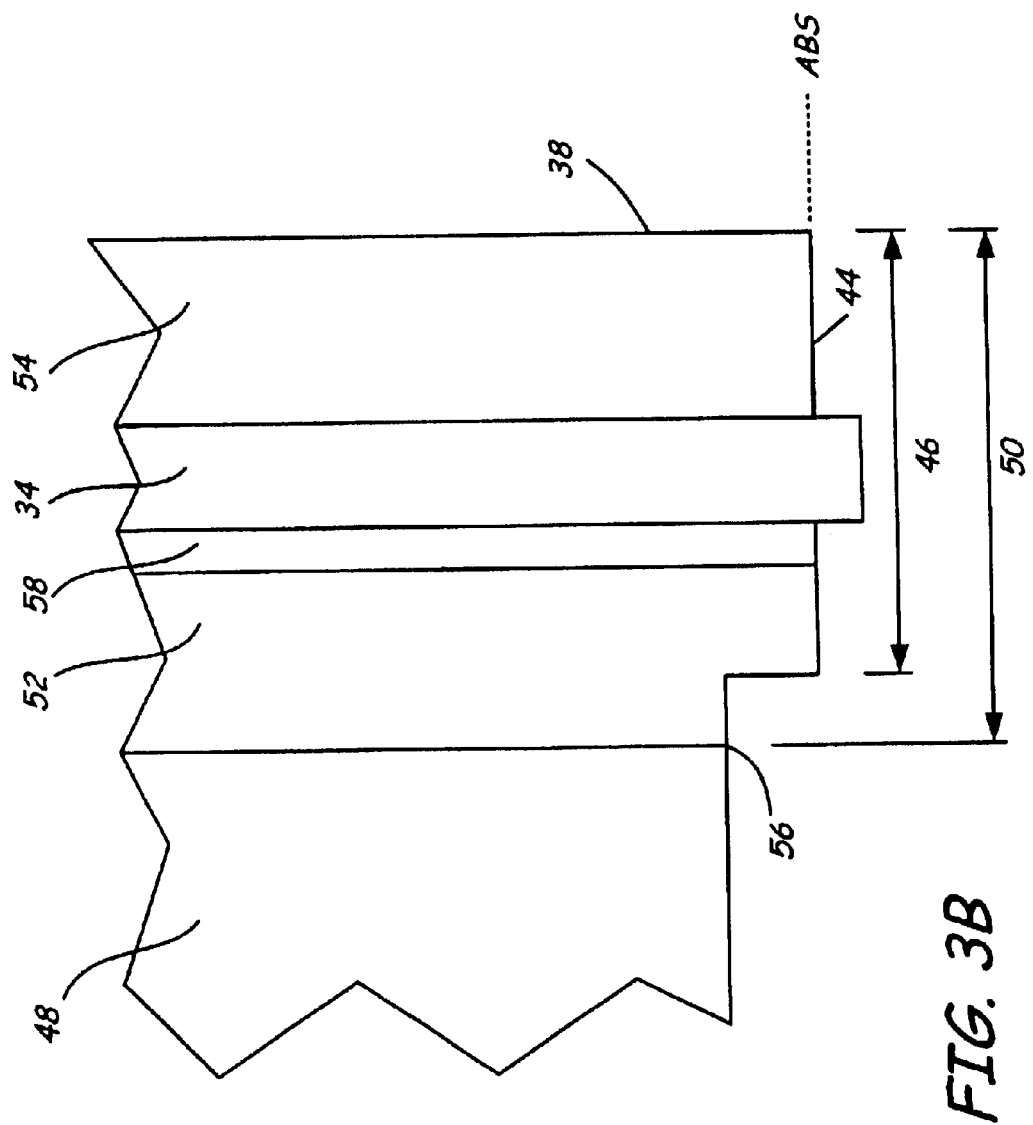
FIG. 3B is a sectional view of another embodiment of the slider shown in FIG. 2.

FIG. 3B is a sectional view of an alternative embodiment of slider 20 of FIG. 2 taken along the centerline of slider 20. In FIG. 3B, a dielectric layer 58 of material is formed between basecoat 52 and transducer 34. If basecoat 52 is comprised of a dielectric material, no separating dielectric layer is required (as shown in FIG. 3A). However, when basecoat 52 is comprised a non-dielectric material having a CTE closely matching the CTE of the metallic layers of transducing head 34, dielectric layer 58 is needed.

Figure 4:
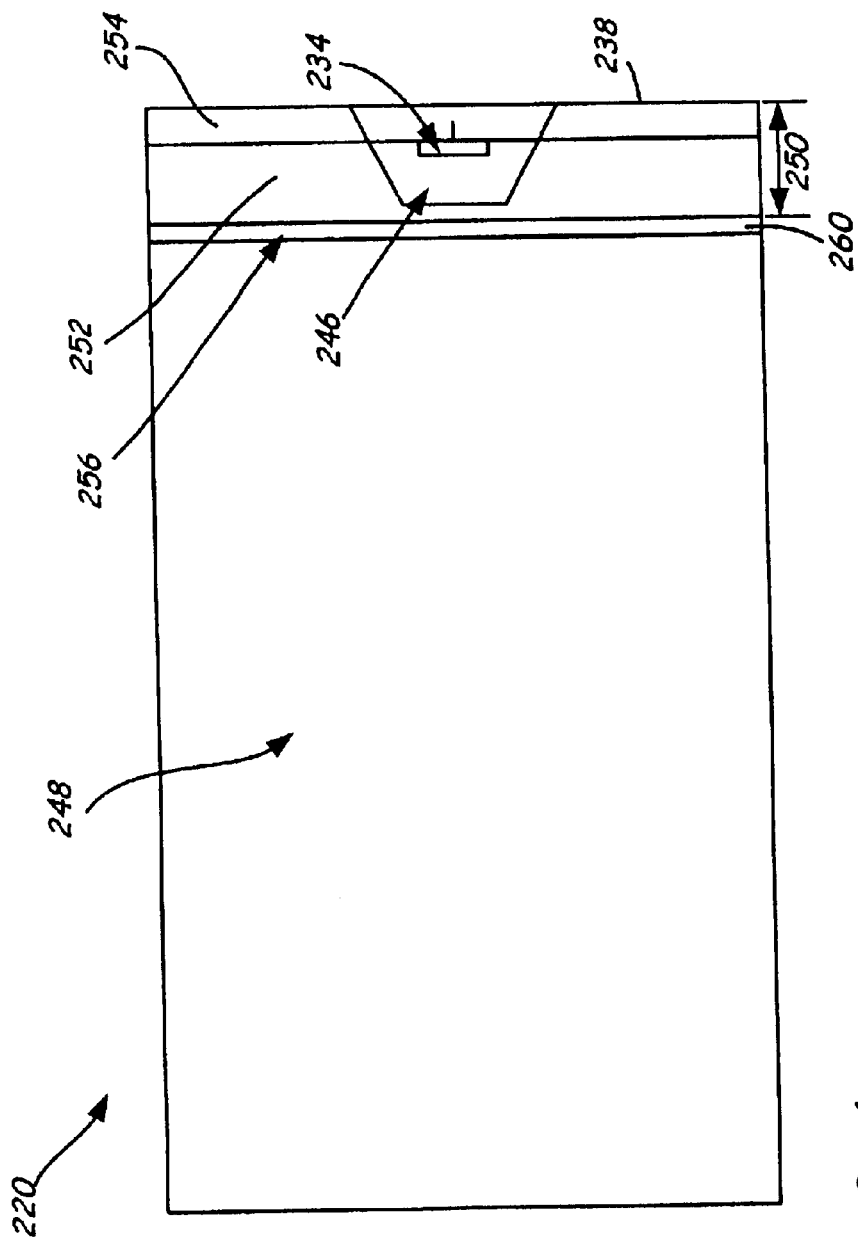
FIG. 4 is a bottom view of another embodiment of a slider of the present invention.

FIG. 4 is a bottom view of another embodiment of a slider 220 of the present invention. Like structure between all the embodiments of the present invention are referred to by like numerals throughout. Similar to slider 20 shown in FIG. 2, slider 220 includes a slider body 248 composed of a substrate material, an end layer 250 formed at a trailing edge 238 of slider 220, a center rail 246 positioned solely upon end layer 250 and a transducing head 234 formed in center rail 246. End layer 250 is comprised of a basecoat layer 252 and an overcoat layer 254. In addition, slider 220 includes an expansion joint or buffer layer 260, formed along an interface 256 between substrate 248 and basecoat 252.

Figure 5:
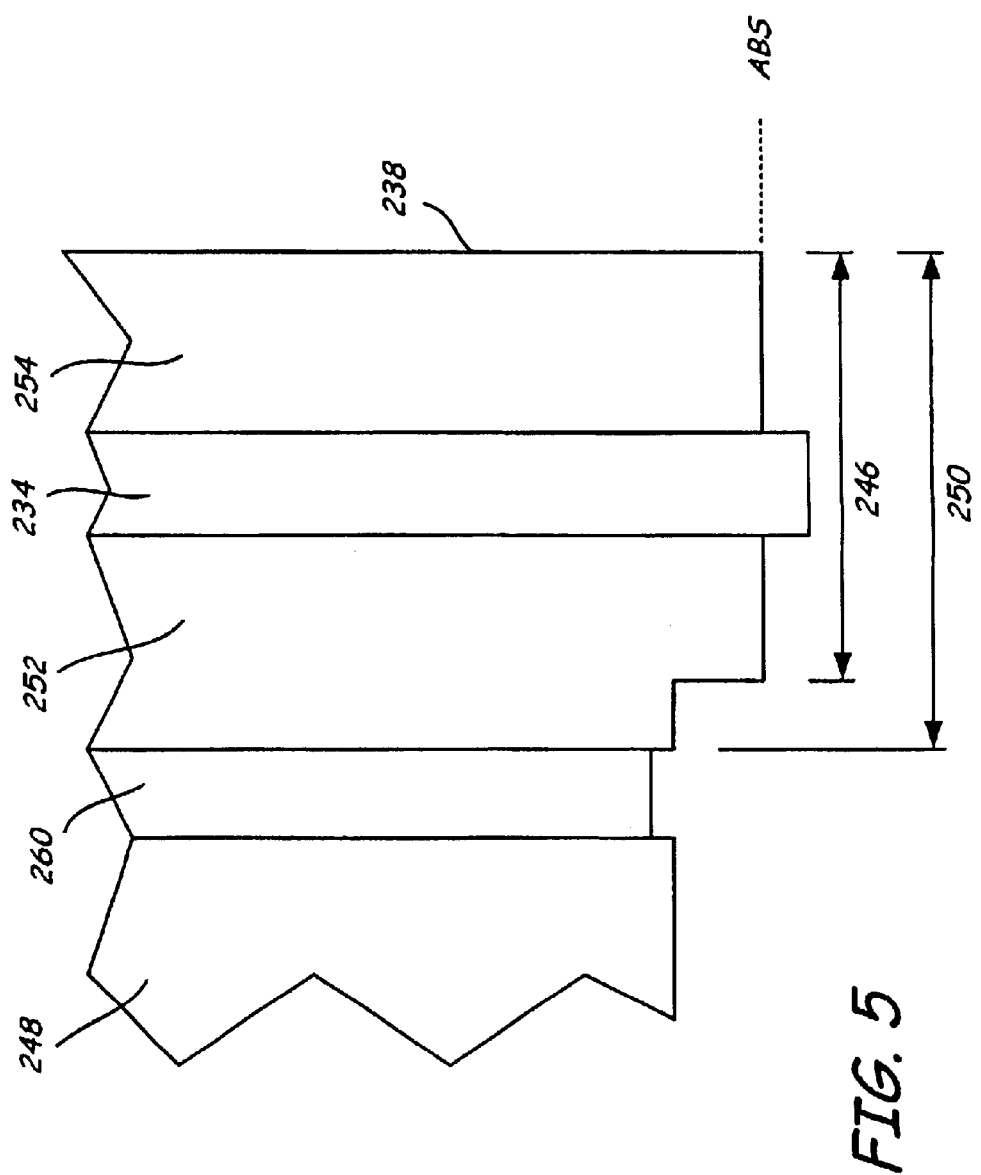
FIG. 5 is a sectional view of the slider shown in FIG. 4.

FIG. 5 is a sectional view of slider 220 shown in FIG. 4 taken along a centerline C of slider 220. Expansion joint 260 absorbs any interface 256 deformation between substrate 248 and basecoat 252 and leaves the surrounding layer profiles substantially undisturbed. The material forming expansion joint 260 typically has a CTE greater than the CTE of substrate 248 and less than the CTE of end layer 250, and preferably the CTE of expansion joint 260 is $9 \times 10^{-6}/°$ C. The key feature of expansion joint 260 is that it has a low Young's modulus. The Young's modulus of expansion joint 260 is less than the Young's modulus of both substrate 248 and end layer 250 materials (whichever is smaller). A thickness of expansion joint 260 is related to the Young's modulus of expansion joint 260. As the Young's modulus decreases, the required thickness of expansion joint 260 decreases as well. An example of a suitable material for expansion joint 260 is silicon oxide nitride ($SiO_xN_y$).

Expansion joint 260 runs along the entire interface 256 between substrate 248 and basecoat 252. However, in other embodiments of the present invention, expansion joint 260 may be comprised of pads or a patterned layer between substrate 248 and basecoat 252. Expansion joint 260 absorbs the material expansion in basecoat 252 and overcoat 254 layers and eliminates deformation of center rail 246. Deformation typically occurs because of the inelasticity of substrate 248, which could hold back the expansion of end layer 250. Expansion joint 260 absorbs the deformation and allows end layer 250 and substrate 248 to act independently of each other such that no deformation occurs in center rail 246.

The present invention reduces thermal pole tip recession and protrusion by a transducing head. The present invention includes improved materials comprising basecoat and overcoat layers of a slider. In addition, the transducing head is formed in a center rail which is formed solely upon the basecoat and overcoat layers of the slider. The present invention eliminates the substrate from an air bearing surface by thickening the basecoat and forming the transducer fly surface exclusively from the basecoat and overcoat combination, that is the transducer fly surface is formed solely within the center rail, which is formed solely upon the basecoat and is formed of the same material as the basecoat. In addition, the basecoat and overcoat layers are formed from a material having a CTE approximately equivalent to the CTE of the metallic layers forming the transducing head. Thus, the center rail forms the reference point for the air bearing surface. Because the transducing head, center rail, and basecoat layers expand and contract in unison with respect to the slider body, they move in concord with each other and there is no TPTR of the transducing head with respect to the ABS of the slider. Furthermore, the present invention may include an expansion joint located between the substrate and the basecoat of the slider. The expansion joint absorbs any interface deformation between the substrate and the basecoat and leaves the surrounding layer profiles, in particular the center rail, substantially undisturbed.

Although the present invention has been described with reference to preferred embodiments, workers skilled in the art will recognize that changes may be made in form and detail without departing from the spirit and scope of the invention.

What is claimed is:

1. A magnetic head slider comprising:
    a substrate having a disc opposing face bounded by a leading face, a trailing face, and first and second side edges, the substrate having a longitudinal axis;
    an end layer positioned upon the trailing face of the substrate, the end layer comprised of a material having a coefficient of thermal expansion greater than $7 \times 10^{-6}/°C$. and the end layer having a disc opposing face;
    an air bearing pad formed solely on the disc opposing face of the end layer; and
    a transducing head formed in the air bearing pad and exposed at an air bearing surface.

2. The magnetic head of claim 1 wherein the end layer is comprised of $TiO_2$, $MgO$, $Y_2O_3$—$ZrO_2$, $BeO$, $Y_2O_3$ or $TiN$.

3. The magnetic head slider of claim 1 wherein the transducing head is comprised of a plurality of metallic layers.

4. The magnetic head slider of claim 3 wherein the coefficient of thermal expansion of the end layer is greater than a coefficient of thermal expansion of the substrate and equivalent to a coefficient of thermal expansion of the metallic layers of the transducing head.

5. The magnetic head slider of claim 1, and further comprising:
    a buffer layer positioned between the substrate and the end layer.

6. The magnetic head slider of claim 5 wherein the buffer layer has a coefficient of thermal expansion greater than a coefficient of thermal expansion of the substrate and less than the coefficient of thermal expansion of the end layer.

7. The magnetic head slider of claim 6 wherein the coefficient of thermal expansion of the buffer layer is about $9 \times 10^{-6}/°C$.

8. The magnetic head slider of claim 5 wherein the substrate, the end layer, and the buffer layer each have a Young's modulus and the Young's modulus of the buffer layer is less than the Young's modulus of both the substrate and the end layer.

9. A magnetic head having an air bearing surface and comprising:
    a substrate;
    a basecoat positioned upon the substrate;
    a center rail positioned upon the basecoat adjacent the air bearing surface; and
    a data transducer formed in the center rail and exposed at the air bearing surface, the data transducer including a plurality of metallic layers wherein a coefficient of thermal expansion of the basecoat is equivalent to a coefficient of thermal expansion of the metallic layers.

10. The magnetic head of claim 9 wherein the center rail and the basecoat are comprised of a same material.

11. The magnetic head of claim 9 wherein the coefficient of thermal expansion of the basecoat is greater than $7 \times 10^{-6}/°C$.

12. The magnetic head of claim 11 wherein the basecoat is comprised of $TiO_2$, $MgO$, $Y_2O_3$—$ZrO_2$, $BeO$, $Y_2O_3$ or $TiN$.

13. The magnetic head of claim 9 wherein the basecoat is comprised of a dielectric material.

14. The magnetic head of claim 9, and further comprising a layer of dielectric material separating the transducer and the basecoat.

15. The magnetic head of claim 9, and further comprising:
    an expansion joint positioned between the substrate and the basecoat.

16. The magnetic head of claim 15 wherein the expansion joint has a coefficient of thermal expansion greater than a coefficient of thermal expansion of the substrate and less than the coefficient of thermal expansion of the basecoat.

17. The magnetic head of claim 14 wherein the coefficient of thermal expansion of the expansion joint is about $9 \times 10^{-6}/°C$.

18. The magnetic head of claim 15 wherein the substrate, the basecoat, and the expansion joint each have a Young's modulus and the Young's modulus of the expansion joint is less than the Young's modulus of both the substrate and the basecoat.

19. The magnetic head of claim 18 wherein when the Young's modulus of the expansion joint is decreased a thickness of the expansion joint is reduced, and when the Young's modulus of the expansion joint is increased the thickness of the expansion joint is increased.

20. The magnetic head of claim 9, and further comprising:
an overcoat positioned upon the transducer wherein the overcoat is comprised of a same material as the basecoat.

21. A slider for supporting a transducing head proximate a rotating disc, the slider comprising:
a slider body having a disc opposing face bounded by a leading edge, a trailing edge, and first and second side edges, the slider body having a longitudinal axis and comprising:
a substrate; and
a basecoat positioned along the trailing edge of the slider body and forming the trailing edge;
a center rail positioned on the disc opposing face of the slider body upon the basecoat;
wherein the transducing head comprises a plurality of metallic layers formed in the center rail; and
wherein a coefficient of thermal expansion of the basecoat is greater than a coefficient of thermal expansion of the substrate and approximately equivalent to a coefficient of thermal expansion of the metallic layers of the transducing head.

22. The slider of claim 21, and further comprising:
an overcoat positioned upon the basecoat adjacent the trailing edge wherein the basecoat and the overcoat are comprised of a same material.

23. The slider of claim 21, and further comprising:
an expansion joint positioned between the substrate and the basecoat.

24. The slider of claim 23 wherein the expansion joint has a coefficient of thermal expansion greater than a coefficient of thermal expansion of the substrate and less than the coefficient of thermal expansion of the basecoat.

25. The slider of claim 24 wherein the coefficient of thermal expansion of the expansion joint is about $9 \times 10^{-6}/°$ C.

26. The slider of claim 23 wherein the substrate, the basecoat, and the expansion joint each have a Young's modulus and the Young's modulus of the expansion joint is less than the Young's modulus of both the substrate and the basecoat.

27. The slider of claim 21 wherein the coefficient of thermal expansion of the basecoat is greater than $7 \times 10^{-6}/°$ C.

28. The slider of claim 27 wherein the basecoat is comprised of $TiO_2$, $MgO$, $Y_2O_3$—$ZrO_2$, $BeO$, $Y_2O_3$ or $TiN$.

* * * * *